United States Patent
Horiguchi et al.

(10) Patent No.: US 6,810,199 B1
(45) Date of Patent: Oct. 26, 2004

(54) INFORMATION PROCESSING APPARATUS, INFORMATION PROCESSING METHOD, AND RECORDING MEDIUM

(75) Inventors: Mari Horiguchi, Kanagawa (JP); Kazuo Yamamoto, Chiba (JP); Harumi Kawamura, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/394,752

(22) Filed: Sep. 13, 1999

(30) Foreign Application Priority Data

Sep. 14, 1998 (JP) .......................................... 10-259735
Oct. 19, 1998 (JP) .......................................... 10-296502
Mar. 2, 1999 (JP) .......................................... 11-053656

(51) Int. Cl.$^7$ ................................................ H04N 5/76
(52) U.S. Cl. ........................................ 386/83; 725/58
(58) Field of Search ................................ 386/1, 83, 94; 725/58; 348/731–734; 455/179.1, 185.1, 186.1, 186.2; 380/201, 203; H04N 5/26, 9/79, 5/50, 5/44

(56) References Cited

U.S. PATENT DOCUMENTS 5,293,357 A * 3/1994 Hallenbeck .................. 725/39
5,335,079 A * 8/1994 Yuen et al. .................... 386/83
6,195,501 B1 * 2/2001 Perry et al. .................... 386/83
6,460,181 B1 * 10/2002 Donnelly ....................... 725/50
6,498,895 B2 * 12/2002 Young et al. .................. 386/83
6,526,220 B2 * 2/2003 Oguro et al. .................. 386/94
6,594,440 B1 * 7/2003 Tanimura et al. ............. 386/83

FOREIGN PATENT DOCUMENTS

| EP | 0 637 157 | 2/1995 | |
|---|---|---|---|
| WO | WO 97 28630 | 8/1997 | |
| WO | WO97/36295 | * 10/1997 | ........... G11B/15/02 |
| WO | WO 98 17033 | 4/1998 | |

* cited by examiner

Primary Examiner—Thai Tran
(74) Attorney, Agent, or Firm—Frommer Lawrence & Haug LLP; William S. Frommer; Dennis M. Smid

(57) ABSTRACT

An information processing apparatus is connected to another information processing apparatus via a network and has at least one sub-unit for executing a predetermined function. A reservation is made for causing a tuner sub-unit of an IRD to receive a predetermined channel broadcast at a predetermined time and to record it on a VCR sub-unit of a DVCR via an IEEE-1394 serial data bus. Then, a controller of the IRD writes reservation information into a Resource Schedule Board (RSB) built into a Bulletin Board Subunit (BBS) of the IRD and also writes reservation information of the VCR sub-unit into a RSB built into a BBS of the DVCR. With this arrangement, double-booking is prevented.

6 Claims, 26 Drawing Sheets

FIG. 10

| opcode | OPEN DESCRIPTOR |
|---|---|
| operand 0 | descriptor_type = $10_{16}$ |
| operand 1 | List ID : $00_{16}$ |
| operand 2 | List ID : $01_{16}$ |
| operand 3 | subfunction WRITE OPEN $03_{16}$ |
| operand 4 | reserved $00_{16}$ |

FIG. 11

| | msb · · · · · lsb |
|---|---|
| opcode | READ DESCRIPTOR ($09_{16}$) |
| operand 0 | descriptor identifier |
| operand 1 | : |
| : | : |
| : | read_result_status |
| : | reserved : $00_{16}$ |
| : | data_length |
| : | address |

FIG. 12

| | msb                               lsb |
|---|---|
| opcode | CREATE DESCRIPTOR (00₁₆) |
| operand 0 | result |
| operand 1 | subfunction_1 |
| operand 2 | reserved |
| operand 3 | |
| : | subfunction_1_specification |
| : | |

FIG. 13

| VALUE OF subfunction_1 | meaning |
|---|---|
| 00₁₆ | create a new descriptor |
| 01₁₆ | create a new object and its child list |
| all other values | reserved for future specification |

FIG. 14

| subfunction_1_specification for subfunction_1=01₁₆ | | | | | | | |
|---|---|---|---|---|---|---|---|
| | msb | | | | | | lsb |
| operand 3 | descriptor_identifier_where | | | | | | |
| : | | | | | | | |
| : | | | | | | | |
| : | descriptor_identifier_what_1 | | | | | | |
| : | | | | | | | |
| : | | | | | | | |
| : | descriptor_identifier_what_2 | | | | | | |
| : | | | | | | | |

FIG. 15

| descriptor_type of descriptor_identifier_ where | descriptor_type of descriptor_identifier_ what_1 | descriptor_type of descriptor_identifier_ what_2 | meaning |
|---|---|---|---|
| $20_{16}$ | $22_{16}$ | $11_{16}$ | Create an object and its child list.<br>create the new object and place it in the location specified by where, the entry_type is specified by what_1. Also create the new list as the child of the new object. The list type is specified by what_2. |
| all other values | | | reserved for future specification |

FIG. 16

| opcode | WRITE DESCRIPTOR (0A₁₆) |
|---|---|
| operand 0 | descriptor identifier |
| : | subfunction : partial_replace (50₁₆) |
| : | group_tag : immediate (00₁₆) |
| : | replacement_data_length |
| : | address |
| : | original_data_length |
| : | replacement_data |

FIG. 17

| opcode | OPEN DESCRIPTOR |
|---|---|
| operand 0 | descriptor_type = 10₁₆ |
| operand 1 | List ID : 00₁₆ |
| operand 2 | List ID : 01₁₆ |
| operand 3 | subfunction CLOSE 00₁₆ |
| operand 4 | reserved 00₁₆ |

FIG. 21

| Value | List definition |
|---|---|
| 1001₁₆ | Resource Schedule List |
| 1002 - 10FF₁₆ | reserved |

FIG. 23

| Address offset | Contents |
|---|---|
| 00₁₆ | non_info_block_fields_length |
| 01₁₆ | |
| 02₁₆ | board_type |
| 03₁₆ | object_list_maximum_size |
| 04₁₆ | |
| 05₁₆ | object_entries_maximum_number |
| 06₁₆ | |
| 07₁₆ | object_entry_maximum_size |
| 08₁₆ | |
| 09₁₆ | board_type_dependent_information_length |
| 0A₁₆ | |
| 0B₁₆ | board_type_dependent_information |
| 0C₁₆ | |
| 0D₁₆ | |
| ⋮ | optional info blocks for future expansion |
| ⋮ | |
| ⋮ | |

| Value | Board type |
|---|---|
| 00₁₆ | Reserved |
| 01₁₆ | Resource Schedule Board |
| 02₁₆ - FF₁₆ | Reserved for future specification |

FIG. 26

| Address_offset | Contents |
|---|---|
| 00₁₆ | non_info_block_length |
| 01₁₆ | |
| 02₁₆ | |
| 03₁₆ | start_time |
| 04₁₆ | |
| 05₁₆ | |
| 06₁₆ | |
| 07₁₆ | |
| 08₁₆ | |
| 09₁₆ | Duration |
| 0A₁₆ | |
| 0B₁₆ | |
| 0C₁₆ | repeat_information_length |
| 0D₁₆ | repeat_information |
| 0E₁₆ | |
| ⋮ | |
| ⋮ | info blocks |
| ⋮ | |

FIG. 27

| Address_offset | Contents |
|---|---|
| $00_{16}$ | year (msb) |
| $01_{16}$ | year (lsb) |
| $02_{16}$ | month |
| $03_{16}$ | day |
| $04_{16}$ | hour |
| $05_{16}$ | minute |
| $06_{16}$ | second |

FIG. 28

| Address_offset | Contents | |
|---|---|---|
| $00_{16}$ | Reserved (4 bits) | hours (msb) |
| $01_{16}$ | hours (lsb) | |
| $02_{16}$ | minutes | |
| $03_{16}$ | seconds | |

FIG. 29

| Values | definition |
|---|---|
| 00₁₆ | Weekly schedule |
| 01₁₆ - 0F₁₆ | reserved |
| 10₁₆ | Interval schedule |
| 0F₁₆ - FF₁₆ | reserved |

FIG. 30

| address_offset | contents (msb ... lsb) | | | | | | | |
|---|---|---|---|---|---|---|---|---|
| 0E₁₆ | repeat_type | | | | | | | |
| 0F₁₆ | number_of_events | | | | | | | |
| 10₁₆ | Sunday | Monday | Tuesday | Wednesday | Thursday | Friday | Saturday | Reserved |

FIG. 31

| address_offset | contents | |
|---|---|---|
| 0E$_{16}$ | repeat_type | |
| 0F$_{16}$ | number_of_events | |
| 10$_{16}$ | Reserved (4 bits) | Interval: hours(msb) |
| 11$_{16}$ | Interval: hours(lsb) | |
| 12$_{16}$ | Interval: minutes | |
| 13$_{16}$ | Interval: seconds | |

FIG. 32

| address_offset | contents |
|---|---|
| 00$_{16}$ | compound_length |
| 01$_{16}$ | |
| 02$_{16}$ | info_block_type |
| 03$_{16}$ | |
| 04$_{16}$ | primary_fields_length |
| 05$_{16}$ | |
| 06$_{16}$ | number_of_subunits |
| 07$_{16}$ | subunit_type_and_ID[0] |
| : | : |

FIG. 33

| Address_offset | Contents |
|---|---|
| $00_{16}$ | supported_board_type |
| $01_{16}$ | supported_board_type_version |
| $02_{16}$ | implementation_profile_ID |
| $03_{16}$ | supported_board_type_dependent_information_length_ |
| $04_{16}$ | |
| $05_{16}$ | supported_board_type_dependent_information |
| ⋮ | |
| ⋮ | |

INFORMATION PROCESSING APPARATUS, INFORMATION PROCESSING METHOD, AND RECORDING MEDIUM

BACKGROUND OF THE INVENTION

1. Field of the Invention

The present invention generally relates to information processing apparatuses, information processing methods, and recording media. More particularly, the invention relates to an information processing apparatus which is connected to other information processing apparatuses via an IEEE-1394 serial data bus and which reliably and individually controls built-in sub-units. The invention also pertains to an information processing method used in the above type of information processing apparatus and to a recording medium implementing this method.

2. Description of the Related Art

Audio/visual (AV) machines that can transmit information to each other via a network using an IEEE-1394 serial data bus are being developed. In this network, it is possible to control the AV machines connected to the network by using a predetermined command (AV/C Command Transaction Set). For example, a video picture received by an Integrated Receiver Decoder (IRD) 71 for receiving digital satellite broadcasts can be recorded, as shown in FIG. 1, on a Digital Video Cassette Recorder (DVCR) 81 connected to the IRD 71 via an IEEE-1394 serial data bus 2 (hereinafter simply referred to as the "bus 2"). Additionally, what is called "recording reservations" can be made by using the IRD 71 and the DVCR 81.

According to the recording reservation processing, a controller 72 of the IRD 71 controls the IRD 71 and the DVCR 81. More specifically, the recording-reservation settings (channel, recording start time, etc.) are made on the IRD 71, and when the recording start time is reached, the controller 72 of the IRD 71 controls a tuner sub-unit 73 to select the reserved (set) channel and to output a received video signal to the DVCR 81 via the bus 2. Simultaneously, the controller 72 transmits a recording start command to a VCR sub-unit 84 of the DVCR 81 via the bus 2. In response to the recording start command transmitted from the controller 72, the VCR sub-unit 84 of the DVCR 81 records the video signal supplied from the tuner sub-unit 73 on magnetic tape (not shown).

As discussed above, it is possible to control the operation of the DVCR 81 from another machine (in the example shown in FIG. 1, the IRD 71) connected to the DVCR 81 via the bus 2. In this case, there may be a danger that what is called "double-booking" occurs.

For example, when a recording reservation (recording reservation A) of a digital satellite broadcast is input into the IRD 71, the reservation information is stored in the controller 72 of the IRD 71. Thereafter, if a recording reservation (recording reservation B) of a terrestrial analog broadcast, which is to be broadcast at the same time as the recording reservation A, is input into the DVCR 81, a controller 82 of the DVCR 81 receives and stores the recording reservation B since the information concerning the recording reservation A input into the IRD 71 has not been reported to the DVCR 81. Thus, upon reaching the time when both the recording reservation A and the recording reservation B are started, video pictures are inconveniently supplied from both the tuner sub-unit 73 of the IRD 71 and an analog tuner block 83 of the DVCR 81 to the VCR sub-unit 84 of the DVCR 81.

The above inconvenience originates from the fact that reservation information managed by an AV machine is not available for another AV machine connected via the bus 2.

In order to overcome the above-described drawback, a CS mode is conventionally provided for the DVCR 81. According to the CS mode, the DVCR 81 is controlled only by the controller 72 of the IRD 71 and enters the recording standby position. After the recording reservation A is input into the IRD 71, the DVCR 81 is set in the CS mode, thereby preventing the occurrence of double-hooking.

However, since the DVCR 81 set in the CS mode goes into the reservation standby position, it cannot execute processing, such as reproduction of video signals, thereby decreasing the ease of operation.

Further, information (recording start time, etc.) managed by an AV machine is not reported to the other AV machines. Because of this, when the AV machines simultaneously output information to the bus 2, the amount of information may exceed the bandwidth of the bus 2, causing transmission errors to occur.

SUMMARY OF THE INVENTION

Accordingly, in view of the above background, it is an object of the present invention to improve the ease of reserve-recording operation and to inhibit the occurrence of double-booking by mutually searching information managed by the individual AV machines connected to a bus.

In order to achieve the above object, according to one aspect of the present invention, there is provided an information processing apparatus including an input unit for inputting reservation information concerning a reservation of the sub-unit. A storage unit stores the reservation information concerning the reservation of the sub-unit. A supply unit reads out the reservation information stored in the storage unit and supplies the reservation information to an external information processing apparatus in response to a request from the external information processing apparatus.

The aforementioned information processing apparatus may further include a write unit for writing the reservation information of the sub-unit of the information processing apparatus into the storage unit and for writing reservation information of a sub-unit of the external information processing apparatus into a storage unit of the external information processing apparatus when a reservation is made for using the sub-unit of the information processing apparatus in cooperation with the sub-unit of the external information processing apparatus at the same time.

The aforementioned information processing apparatus may further include a comparison unit for comparing the reservation information input by the input unit with the reservation information stored in the storage unit of the information processing apparatus and the reservation information of the storage unit of the external information processing apparatus including the sub-unit to be used at the same time as the sub-unit of the information processing apparatus. Accordingly, the writing means may write the reservation information in accordance with a comparison result obtained by the comparison unit.

The write unit may restrict the reservation information to be written into the storage unit of the information processing apparatus from the external information storage apparatus when the writing means writes the reservation information into the storage unit of the information processing apparatus.

The write unit may interrupt the external information processing apparatus from reading the reservation information from the storage unit of the information processing apparatus when the write unit writes the reservation information into the storage unit of the information processing apparatus.

The storage unit may store limitation information concerning a limitation of the reservation information to be stored, and the supply unit may supply the limitation information to the external information processing apparatus in response to a request form the external information processing apparatus.

The storage unit may store the reservation information at a predetermined address position.

The reservation information may include a sub-unit start time at which the use of the sub-unit is started and a period for using the sub-unit. The period for using the sub-unit may be set as an undefined value.

The reservation information may include apparatus information concerning the information processing apparatus that reserves the sub-unit, and the apparatus information may be stored at an address position subsequent to the address positions of the sub-unit start time and the period for using the sub-unit. The sub-unit start time may be represented by a binary-coded decimal (BCD).

The storage unit may further store identification information for identifying the stored reservation information.

The identification information may include a value unique to the information processing apparatus that has reserved the sub-unit and a value unique to the reservation set in the information processing apparatus.

The value unique to the information processing apparatus may be a global unique ID, and the value unique to the reservation may be a record ID.

The reservation information may include weekly reservation information of the sub-unit that is weekly reserved by specifying a day of the week.

The reservation information may include interval reservation information of the sub-unit that is repeatedly reserved at a predetermined interval.

The storage unit may be one of the sub-units.

The network may be formed by using an IEEE-1394 serial data bus.

According to another aspect of the present invention, there is provided an information processing method for use in an information processing apparatus. The information processing method includes an input step of inputting reservation information concerning a reservation of a sub-unit, a storage control step of controlling storage of the reservation information concerning the reservation of the sub-unit, and a supply step of reading out the reservation information stored by processing of the storage control step and of supplying the reservation information to an external information processing apparatus in response to a request from the external information processing apparatus.

According to still another aspect of the present invention, there is provided a recording medium for recording a program for controlling an information processing apparatus. The program includes an input step of inputting reservation information concerning a reservation of a sub-unit, a storage control step of controlling storage of the reservation information concerning the reservation of the sub-unit, and a supply step of reading out the reservation information stored by processing of the storage control step and of supplying the reservation information to an external information processing apparatus in response to a request from the external information processing apparatus.

According to the information processing apparatus, the information processing method, and the recording medium, the reservation information concerning a reservation of a sub-unit is stored, and in response to a request from an external information processing apparatus, the stored reservation information is supplied to the external information processing apparatus.

BRIEF DESCRIPTION OF THE DRAWINGS

FIG. 10 illustrates the format of a WRITE OPEN command;

FIG. 11 illustrates the format of a READ command;

FIG. 12 illustrates the format of a CREATE command;

FIG. 13 illustrates the subfunction_1 shown in FIG. 12;

FIG. 14 illustrates the details of the subfunction_1 shown in FIG. 13;

FIG. 15 illustrates the values of the fields shown in FIG. 14;

FIG. 16 illustrates the format of a WRITE DESCRIPTOR command;

FIG. 17 illustrates the format of a CLOSE command;

FIG. 21 illustrates the root_object_list_ID shown in FIG. 20;

FIG. 23 illustrates the format of the Write Enabled list_specific_information shown in FIG. 22;

FIG. 26 illustrates the format of the Resource Schedule Entry shown in FIG. 25;

FIG. 27 illustrates the format of the start_time shown in FIG. 26;

FIG. 28 illustrates the format of the Duration shown in FIG. 26;

FIG. 29 illustrates the format of the repeat_type shown in FIG. 30;

FIG. 30 illustrates the format of the repeat information shown in FIG. 26;

FIG. 31 illustrates the format of the repeat_information shown in FIG. 26;

FIG. 32 illustrates the format of Info blocks shown in FIG. 26;

FIG. 33 illustrates the format of the supported_board_ type specific_information shown in FIG. 20.

DESCRIPTION OF THE PREFERRED EMBODIMENTS

Figure 1:
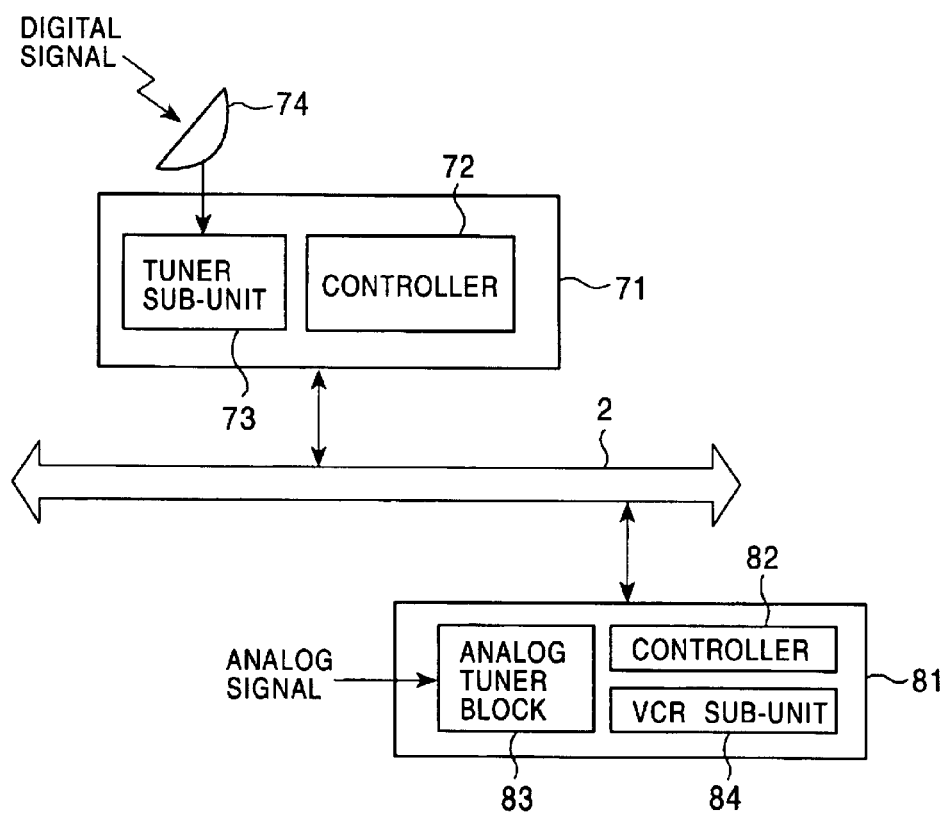
FIG. 1 is a block diagram illustrating an example of the configuration of a related network system.
Figure 2:
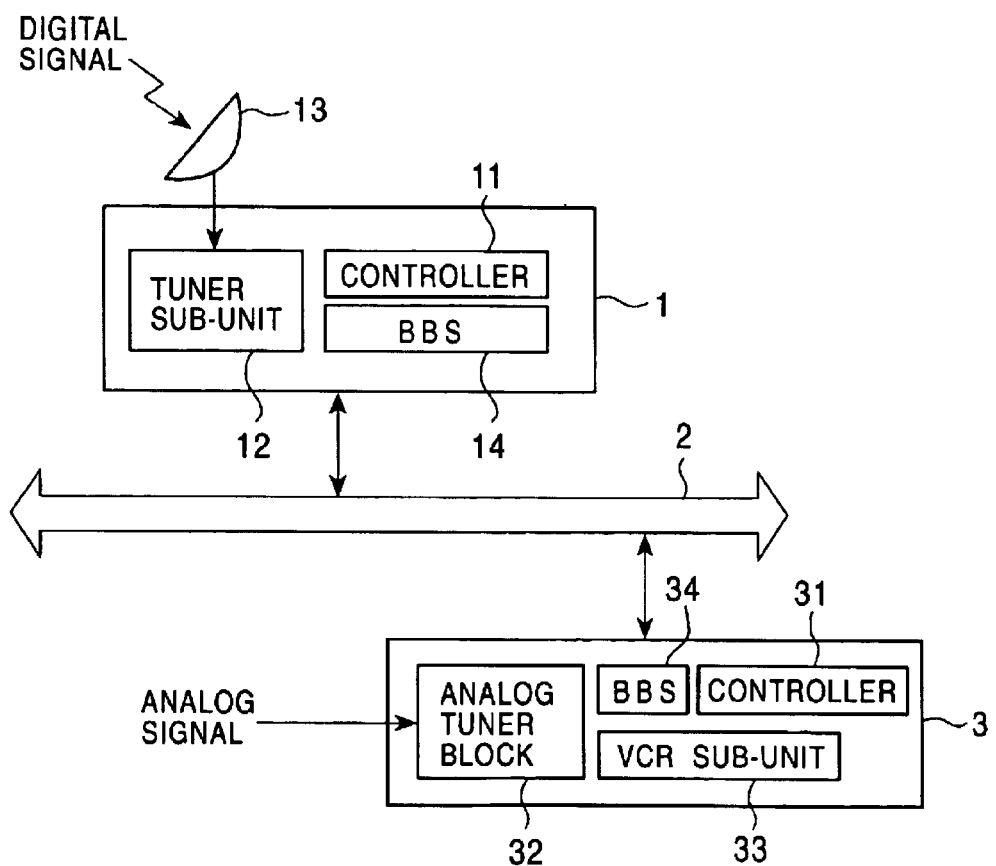
FIG. 2 is a block diagram illustrating the configuration of a network system incorporating an embodiment of the present invention.

The configuration of a network system incorporating an embodiment of the present invention is described below with reference to FIG. 2. Throughout the specification, the term "system" indicates an entire apparatus formed of a plurality of devices, means, and so on.

This network system is formed of an IRD 1 and a DVCR 3 connected to each other via a bus 2. In addition to the IRD 1 and the DVCR 3, electronic machines provided with an IEEE-1394 terminal, such as personal computers, hard disk drives, compact disc (CD) players, monitors, digital video cameras, and mini disc (MD) (brand name) players, may be connected to the bus 2.

Electronic machines, such as the IRD 1 and the DVCR 3, connected to the bus 2 are referred to as "units". Among the units, it is possible to read and write information from and into the individual units by using a descriptor (Descriptor) defined in the AV/C Digital Interface Command Set General Specification of the Av/C Command Transaction Set (hereinafter referred to as "AV/C General"). The details of AV/C General can be seen in http://cxn02.net.arch.sony.co.jp/Doc/. The functions provided for the units are referred to as the "subunits".

A controller 11 of the IRD 1 controls the entire IRD 1 by receiving a channel-selecting operation or a recording-reservation operation performed by a user. The controller 11 also controls the DVCR 3 by using a predetermined command (AV/C Command Transaction Set). A CS antenna 13 receives digital signals of a digital satellite broadcast transmitted via a communication satellite (not shown) and outputs the digital signals to a tuner sub-unit 12. The tuner sub-unit 12 extracts a predetermined channel signal from the digital signals input from the CS antenna 13 under the control of the controller 11, and outputs the extracted signal to a VCR sub-unit 33 of the DVCR 3 via the bus 2. The controller 11 further searches for information stored in a Bulletin Board Subunit (BBS) 34 of the DVCR 3.

A BBS 14, which serves as a sub-unit of the IRD 1, stores information concerning recording reservations received and determined by the controller 11 (details are discussed below with reference to FIG. 20).

A controller 31 of the DVCR 3 controls the entire DVCR 3 by receiving a reproducing-instruction operation or a recording-reservation operation performed by a user. An analog tuner block 32 extracts a predetermined channel signal from the input analog signals under the control of the controller 31 and outputs the extracted signal to the VCR sub-unit 33.

The VCR sub-unit 33 records on magnetic tape (not shown) a video signal input from the analog tuner block 32 or a video signal input from the tuner sub-unit 12 of the IRD 1 via the bus 2.

The BBS 34 manages information of recording reservations concerning the DVCR 3.

The tuner sub-unit 12 and the BBS 14 are sub-units of the IRD 1, and the VCR sub-unit 33 and the BBS 34 are sub-units of the DVCR 3. The analog tuner block 32 is not a sub-unit because it is not controlled by another unit via the bus 2 though it executes one of the functions of the DVCR 3.

In this network system, when a recording reservation of a digital satellite broadcast is performed, a user inputs the settings of the recording reservation (channel, recording start time, etc.) into the IRD 1. If the input reservation does not cause double-booking, it is accepted, and the reservation information is written into the BBS 14 of the IRD 1.

Figure 3:
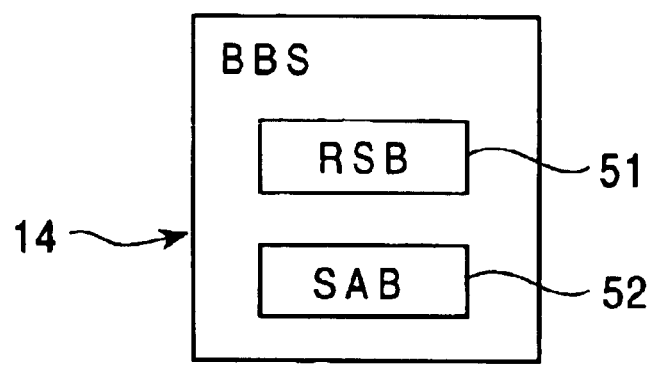
FIG. 3 is a block diagram illustrating the configuration of a Bulletin Board Subunit (BBS) 14 shown in FIG. 2.

The BBS 14 is formed of, as shown in FIG. 3, a Resource Schedule Board (RSB) 51 and a Scheduled Action Board (SAB) 52. The SAB 52 stores all the information concerning recording reservations input from the controller 11 of the IRD 1 and from a controller of another unit (for example, the controller 31 of the DVCR 3). That is, the SAB 52 stores all the information for controlling a series of operations of causing the tuner sub-unit 12 of the IRD 1 to receive information at a predetermined time and to record it on the VCR sub-unit 33 of the DVCR 3.

In contrast, the RSB 51 stores only information concerning reservations for the tuner sub-unit 12 of the IRD 1 among all the information concerning recording reservations (including reservations set by other units). Even if the operation of the VCR sub-unit 33 is related to that of the tuner sub-unit 12, the RSB 51 does not store reservation information of the VCR sub-unit 33. The RSB 51 makes the stored information public in response to a request not only from the controller 11 of the same unit, but also from the controller of another unit (for example, the controller 31 of the DVCR 3).

Figure 4:
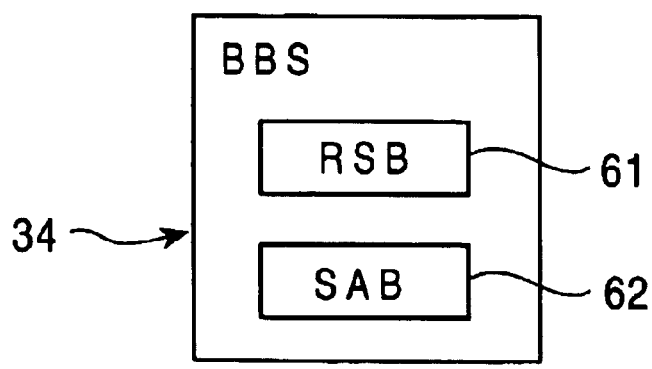
FIG. 4 is a block diagram illustrating the configuration of a BBS 34 shown in FIG. 2.

Similarly, the BBS 34 of the DVCR 3 is formed of, as shown in FIG. 4, a RSB 61 and a SAB 62. The SAB 62 stores all the information concerning recording reservations input from the controller 31 of the DVCR 3 and from another controller of another unit (for example, the controller 11 of the IRD 1). In contrast, the RSB 61 stores only information concerning reservations for the VCR sub-unit 33 of the DVCR 3 among all the information concerning recording reservations input into the controller 31 of the DVCR 3 and into the controller 11 of the IRD 1. Even if the operation of the tuner sub-unit 12 is related to that of the VCR sub-unit 33, the RSB 61 does not store reservation information of the tuner sub-unit 12. The RSB 61 makes the stored information public in response to a request not only from the controller 31 of the same unit, but also from the controller of another unit (for example, the controller 11 of the IRD 1).

Details of information stored in the RSBs 51 and 61 and made public will be described in detail later with reference to FIG. 22.

Figure 5:
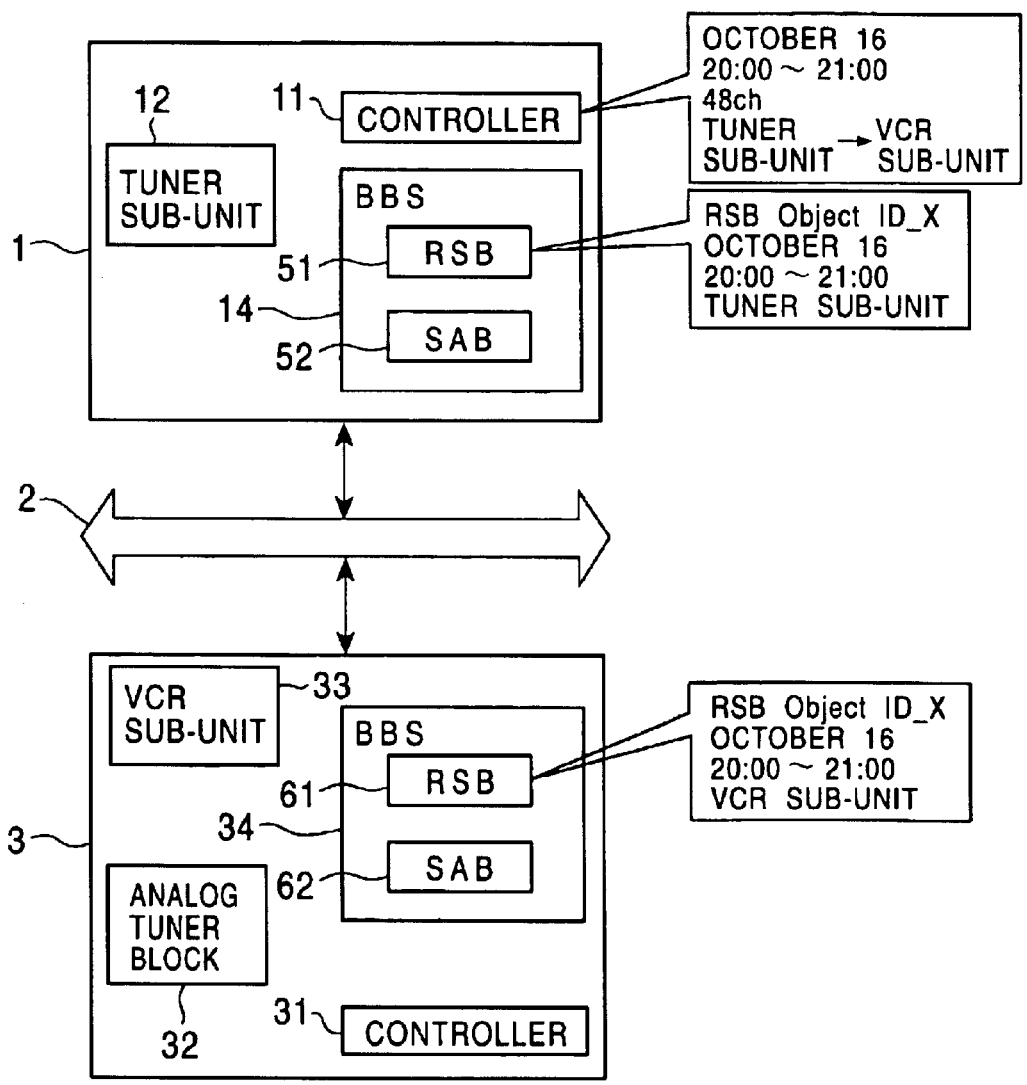
FIG. 5 illustrates an example of the operation of the network system shown in FIG. 2.

The operation related to both the RSBs 51 and 61 is discussed below with reference to FIG. 5. For example, when a recording reservation (which causes the tuner sub-unit 12 to receive the 48 channel from 20:00 to 21:00 on October 16 and to record the received video signal on the VCR sub-unit 33 of the DVCR 3) is input into the controller 11 of the IRD 1, as shown in FIG. 5, the controller 11 sets an ID (BB Object ID) (in this embodiment, ID_X) unique to the reservation, and stores all the information concerning the recording reservation in the SAB 52. The controller 11 also stores in the RSB 51 the set ID (ID_X), the time and date (from 20:00 to 21:00 on October 16), and information (ID information) for specifying the related sub-unit (in this embodiment, tuner sub-unit 12) of the IRD 1. The controller 11 further stores in the RSB 61 of the DVCR 3 the set ID (ID_X), the time and date (from 20:00 to 21:00 on October 16), and information (ID information) for specifying the related sub-unit (in this embodiment, the VCR sub-unit 33) of the DVCR 3.

Figure 6:
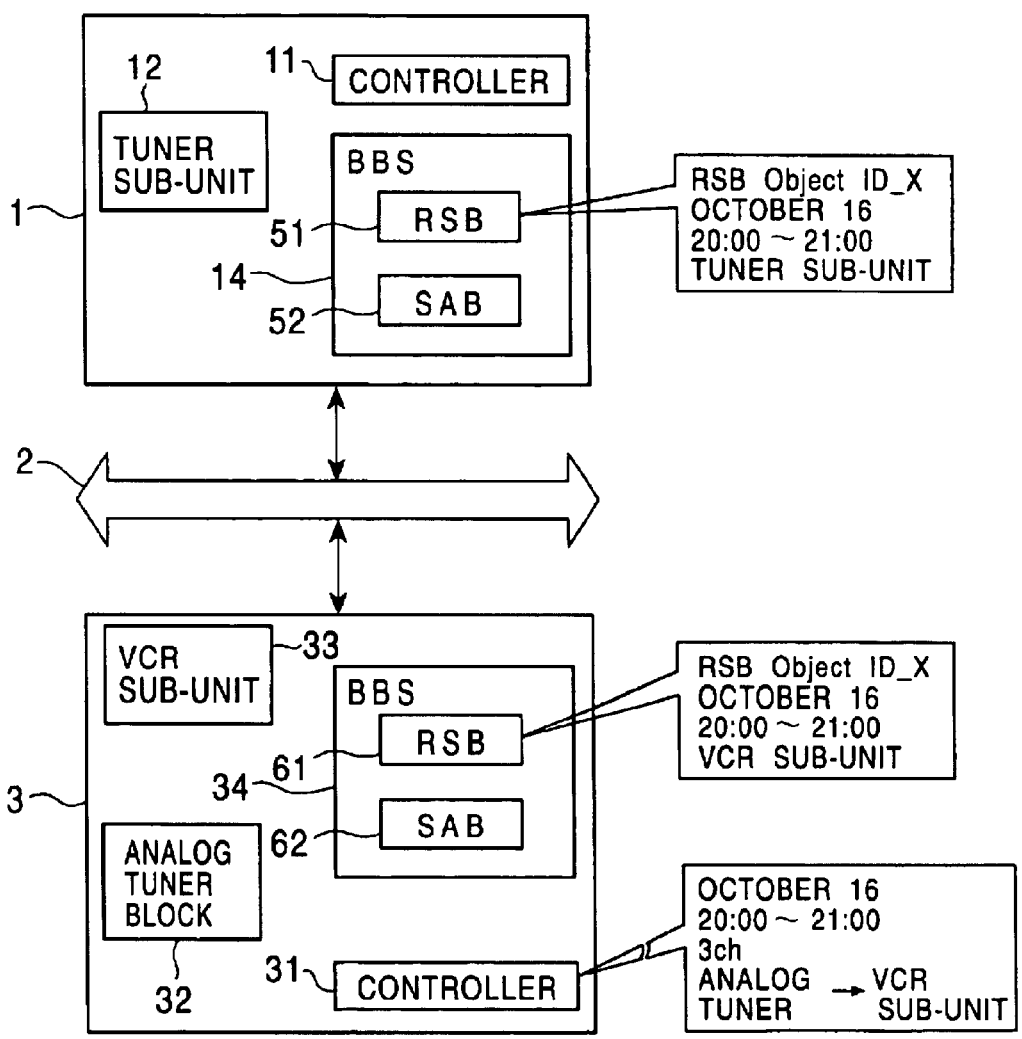
FIG. 6 illustrates an example of the operation of the network system shown in FIG. 2.

Thereafter, when a recording reservation (which causes the analog tuner block 32 to receive the third channel from 20:00 to 21:00 on October 16 and to record the received video image on the VCR sub-unit 33) is input into the controller 31 of the DVCR 3, as shown in FIG. 6, the controller 31 refers to the RSB 61 and determines whether the information of the input recording reservation overlaps with the information of the reservation which has been accepted and made public to the RSB 61. In this case, since the recording time, i.e., from 20:00 to 21:00 on October 16, of the input reservation overlaps with that of the accepted reservation, the input recording reservation is not accepted. If it is determined that the information of one reservation does not coincide with that of the other reservation, the input recording reservation is accepted. All the information is stored in the SAB 62, and the information concerning the VCR sub-unit 33 is stored in the RSB 61.

Details of the above-described reservation processing (contending-unit search processing) are discussed below with reference to the flow charts of FIGS. 7 through 9.

In step S11, a user sets a reservation in the controller 11 of the IRD 1. That is, in the example shown in FIG. 5, a reservation for causing the tuner sub-unit 12 to receive the 48 channel from 20:00 to 21:00 on October 16 and to transfer the received video signal to the VCR sub-unit 33 of the DVCR 3 and record it. Simultaneously, in step S12, the controller 11 controls the RSBs of the units including the target sub-units to be in the WRITE OPEN state. In the example illustrated in FIG. 5, the target sub-units are the tuner sub-unit 12 of the IRD 1 and the VCR sub-unit 33 of the DVCR 3. Accordingly, the controller 11 first selects the tuner sub-unit 12 and outputs a WRITE OPEN command so that the RSB 51 of the IRD 1 including the tuner sub-unit 12 reaches the WRITE OPEN state (the write enable state).

In practice, however, the RSB 51 and the controller 11 are in the same unit, i.e., the IRD 1 and are not connected via the bus 2. Accordingly, the controller 11 controls the RSB 51 as if a WRITE OPEN command were supplied to the RSB 51 via the bus 2.

After the RSB 51 of the IRD 1 including the tuner sub-unit 12 has become the WRITE OPEN state, the controller 11 controls the RSB 61 of the DVCR 3 including the remaining target sub-unit, i.e., the VCR sub-unit 33, to be in the WRITE OPEN state. In this case, the controller 11 outputs a WRITE OPEN command having the format shown in FIG. 10 to the RSB 61 (the controller 31) of the DVCR 3 via the bus 2.

The above WRITE OPEN command is one type of OPEN DESCRIPTOR commands used for making access to a predetermined target address space. As shown in FIG. 10, the value $08_{16}$, which represents the OPEN DESCRIPTOR, is set in the opcode. The value $10_{16}$, which indicates the Object List Descriptor defined by the list ID, is set in operand 0 as the descriptor_type representing the type of the descriptor. In operand 1 and operand 2, list IDs (in this embodiment, 00 and 01) of the RSBs to be accessed (to be in the WRITE OPEN state) are described.

The value $03_{16}$, which indicates that descriptors are to be opened for making access, such as reading or writing, is set in operand 3 as subfunction. The value 00 is set in operand 4 as a reserved value.

Referring back to FIG. 7, in step S13, the controller 11 reads out the descriptor_length and the list_specific_information field (FIG. 22) of the RSB 51 within the BBS 14. The reading operation is performed by using, for example, the READ command shown in FIG. 11. In, this case, since the controller 11 and the RSB 51 are not connected via the bus 2, as stated above, the above data is directly read from the controller 11 to the RSB 51. If, however, the controller 11 reads out data from the RSB 61 of the DVCR 3, the READ command shown in FIG. 11 is output to the RSB 61 (the controller 31) via the bus 2.

As illustrated in FIG. 11, the value $09_{16}$, representing the read descriptor, is set in the opcode, which is the head of the READ command. In the subsequent operand 0, the descriptor identifier for identifying the descriptor to be read is described. In the reading operation in step S13, the descriptor identifier is set by the list ID. More specifically, $00_{16}$ through $0D_{14}$ of the Address_offset of the write enabled list_specific_information field of the RSB shown in FIG. 23 are set.

When the READ command is transmitted, FF is set in the read_result_status. When the READ command is returned from the target as a response, the read result is set. In the data_length, the number of bytes of data to be read from the target is described. When the data_length is set to be 0, all the lists are read. The address at which the reading is started is set in the address. When 00 is set in the address, the reading commences from the head.

Referring back to FIG. 7, in step S14, the controller 11 extracts for the RSB 51 the maximum length of the list (the object_list_maximum_size shown in FIG. 23), the maximum number of entries of the list (the object_entries_maximum_number shown in FIG. 23), and the maximum byte length of each entry (the object_entry_maximum_size shown in FIG. 23).

The controller 11 then determines in step S15 whether data (reservation information) to be recorded on the RSB 51 causes an excess of the maximum length of the list extracted in step S14. If the outcome of step S15 is no, the process proceeds to step S16 in which the controller 11 determines whether the value obtained by subtracting the current number of entries from the maximum number of entries of the list extracted in step S14 is greater than zero, i.e., whether there is any entry left for writing data. If the result of step S16 is yes, the process proceeds to step S17 in which the controller 11 determines whether the value obtained by subtracting the length of the entry of the reservation information to be written from the maximum length of the entry extracted in step S14 is greater than zero, i.e., whether there is any space left for the entry into which data is written.

If any one of the conditions set in steps S15 through S17 is not satisfied, the process proceeds to step S18 in which the controller 11 indicates a warning, such as "reservations are full" to the user. This enables the user to recognize that no more reservations can be made.

Figure 8:
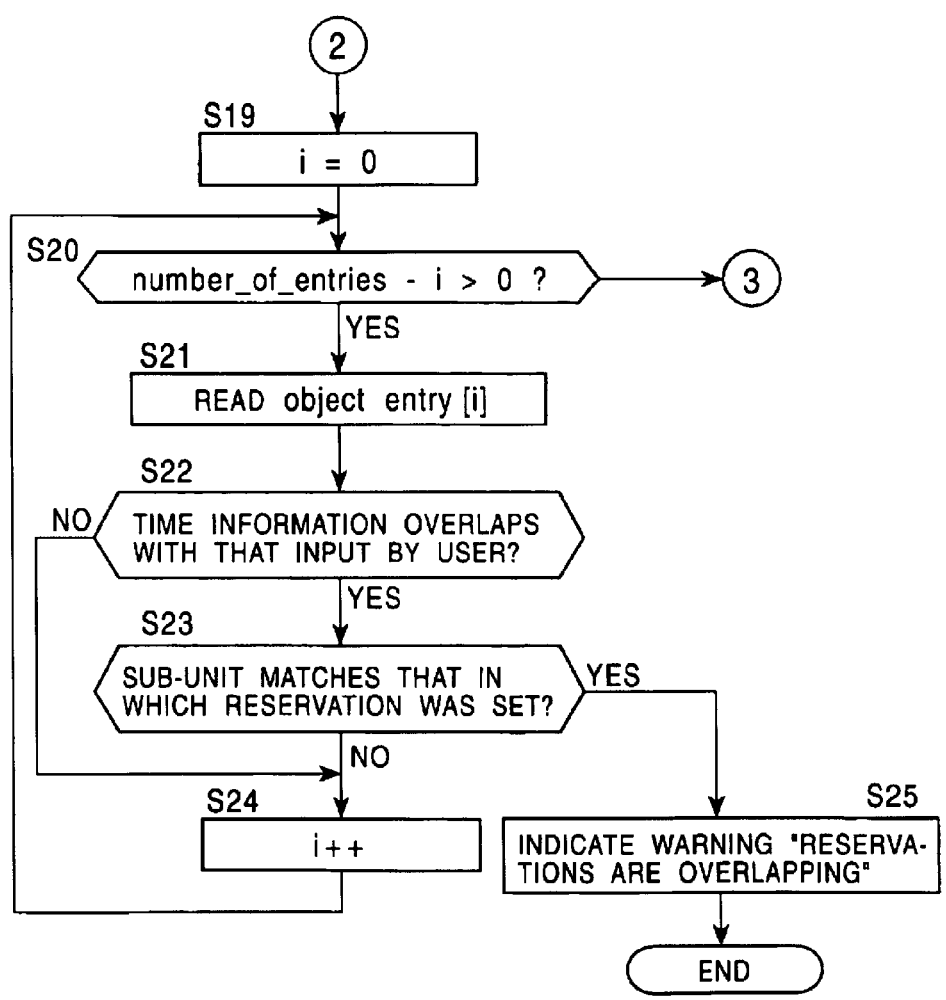
FIG. 8 is a flow chart illustrating the operation of the network system shown in FIG. 5.

If all the conditions set in steps S15 through S17 are met, the reservation information can be written into the RSB 51, and a determination is further made in steps S19 through S25 of FIG. 8 whether the time of the reservation input by the user overlaps with that of the reservation which has already been accepted, i.e., whether double-booking has occurred.

More specifically, in step S19, a variable i is initialized to zero. It is then determined in step S20 whether the value obtained by subtracting the variable i from the number of entries, i.e., the number_of_entries, recorded on the RSB 51 is greater than zero, i.e., whether all the entries recorded on the RSB 51 have been searched. If the outcome of step S20 is yes, the process proceeds to step S21 in which the controller 11 reads out the object_entry[i] (FIG. 25) (in this case, the object_entry [0]) shown on the RSB 51.

Although the reading operation in step S21 is also performed by using the READ command illustrated in FIG. 11, the descriptor identifier is set by the object position. In the object_entry[i], the time information of the registered reservation (the start_time and the Duration shown in FIG. 26) and the ID information of the target sub-unit (the subunit_type_and_ID[0] shown in FIG. 32) are stored, which will be described later.

Then, the controller 11 determines in step S22 whether the time information (the start_time and the Duration) input by the user in step S11 overlaps with the time information (the start_time and the Duration) read in step S21. If the result of step S22 is yes, the process proceeds to step S23. In step S23, the controller 11 determines whether the sub-unit in which the reservation was set in step S11 (in this case, the tuner sub-unit 12) coincides with the sub-unit read in step S21 (the subunit_type_and_ID). If the outcome of step S23 is yes, the time and the sub-unit read in step S21 match those input by the user. Accordingly, the process proceeds to step S25 in which the controller 11 indicates a warning, such as "reservations are overlapping". As a result, the occurrence of double-booking can be prevented.

If it is found in step S22 that the time information input by the user does not overlap with the time information read in step S21, or if it is found in step S23 that the sub-units determined in steps S11 and S21 do not coincide with each other even if time overlapping has occurred in step S22, there is no possibility of generating double-booking. Accordingly, in step S24, the variable i is incremented by one, and the process returns to step S20. Processing similar to the above-described processing is repeated until it is determined in step S20 that the value obtained by subtracting the variable i from the number_of_entries is not greater than zero. That is, all the object_entries[i] stored in the RSB 51 are searched to determine whether there are any overlapping reservations.

If it is found in step S20 that the value obtained by subtracting the variable i from the number_of_entries is not greater than zero, i.e., that all the object_entries[i] have been searched, the process proceeds to step S26. In step S26, the controller 11 outputs a CREATE command to the RSB 51 and creates an object entry in the RSB 51. In this case, the CREATE command is not actually output, and processing is executed as if the CREATE command were output, as stated above. When the object entry is created in the RSB 61, the CREATE command is output.

The above-described steps S15 through S18 may be executed after it is determined in step S20 that the all the entries have not been completely searched.

The above-described CREATE command is described in detail below with reference to FIGS. 12 through 15. FIG. 12 illustrates the format of the AV/C CREATE command. FIG. 13 illustrates the value that can be specified by the subfunction₁ shown in FIG. 12, and in this embodiment, 01 (create a new object and its child list) is used. FIG. 14 illustrates the format of the subfunction_1_specification for subfunction_1=01 shown in FIG. 12. FIG. 15 illustrates the values of the individual fields shown in FIG. 14. If the values 20, 22, and 11 are respectively set, as illustrated in FIG. 15, in the fields, i.e., descriptor_identifier_where, the descriptor_identifier_what_1, and the descriptor_identifier_what_2, of FIG. 14, the meaning is to create a new object and its child list.

Details of the AV/C CREATE command are indicated in IEEE 1394 (see the Internet homepage http://www.1394 TA.org), and the formats used in this embodiment are extracted from the specifications of the IEEE 1394 standards (Enhancement to the AV/C General Specification 3.0 Version 1.0 FC2 and TA Document 1999005 AV/C Bulletin Board Subunit General Specification 1.0 Draft 0.99:149). The information descriptors forming the board (Information List Descriptor) include writable descriptors and readable descriptors, and the list type is used for differentiating the two types.

To write new information into the AV/C descriptor (AV/C Descriptor) from an external source, the following method may be employed as a typical example. The controller issues the above-described CREATE command to the target, and after the target forms a model for writing information, the controller again controls the writing of specific information. More specifically, when information is first written, the controller designates a desired list and issues the AV/C Descriptor CREATE command. Upon receiving this command, the target forms the object based on the model having the data structure specified by the AV/C General. The model having the data structure designated by the AV/C General has a field of the object ID. In the list using the AV/C Descriptor, the object ID is managed by the target, namely, when the object is created, the target adds an ID unique to the object and possesses the function of managing the ID.

The object ID is an ID number for uniquely specifying the object in the list, and the target is required to have the function of preventing the multiple storing of IDs. The BBS merely provides information, and the object IDs are managed by the controller.

When the CREATE command is issued to a sub-unit, inconsistencies may arise. When an object is created, the object ID, which should be managed by the controller, is under the control of the target. After issuing the CREATE command, the controller has to continue the writing control. In this manner, the processing is divided into a plurality of steps. Accordingly, if the controller is accidentally disconnected from the bus while writing information into the BBS, an imperfect object may be created.

To overcome the above-described situation, there is needed a system for specifying the imperfect object and correctly eliminating it. In this embodiment, the writing of information into the BBS is restricted so as to specify imperfect objects.

In creating an object, the target (in this embodiment, the DVCR 3) first assigns temporarily managing numbers (for example, all 0) to a Global unique ID (GUID) of the object ID. The object ID consists of the GUID and the record ID. The controller then writes information into the object, and if the writing operation is correctly completed, the controller finally overwrites the GUID.

According to the above procedure, if the writing operation has been correctly completed, the presence of objects having the GUID indicating all 0 is impossible. Accordingly, such objects can be specified as imperfect objects which were accidentally created while the writing operation was being performed.

Consequently, the objects which are being written can be uniquely identified. It is also possible to distinguish correctly written objects from imperfect objects and to easily eliminate the imperfect objects (invalid objects). This further makes it possible to effectively utilize a finite memory provided for an electronic apparatus. According to the above method, the objects which are being written can be simply specified by temporarily assigning 0 to the GUID. Software for eliminating imperfect objects can easily be created accordingly.

Figure 9:
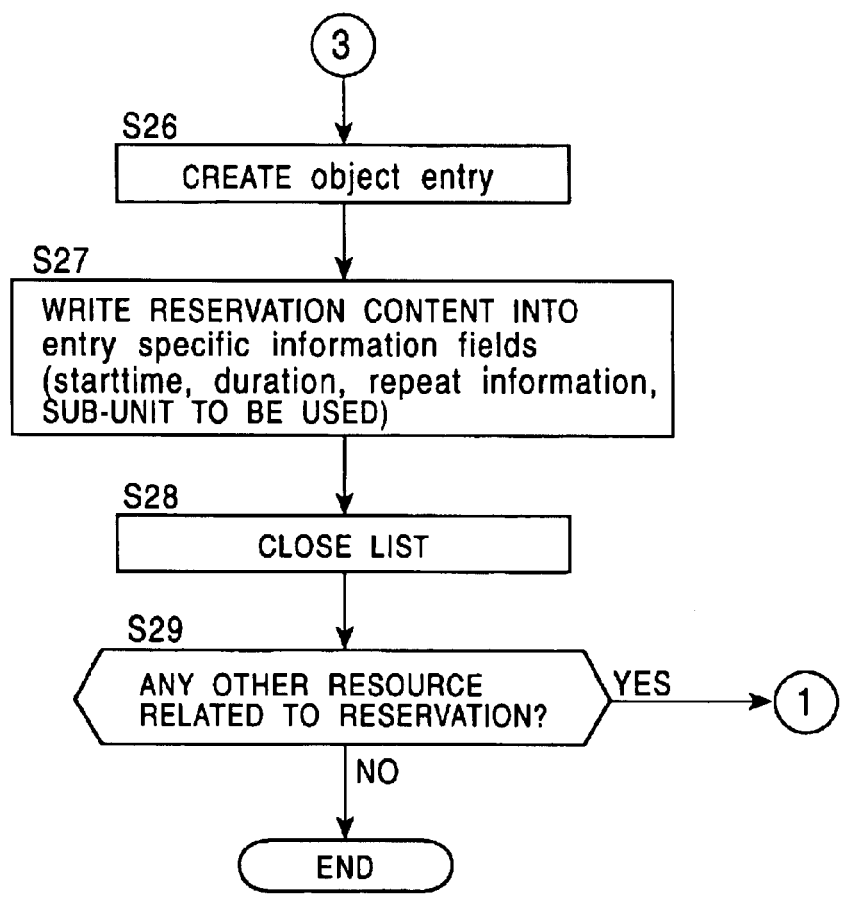
FIG. 9 is a flow chart illustrating the operation of the network system shown in FIG. 5.

In step S26 of FIG. 9, the INSERT command may be used instead of the CREATE command.

Referring back to FIG. 9, the process proceeds to step S27 in which the controller 11 writes the reservation content into the entry_specific_information fields (FIGS. 26 through 32) of the RSB 51. That is, the start_time, the Duration, and the repeat_information, and the target sub-unit (subunit_type_and_ID) are written.

FIG. 16 illustrates the WRITE DESCRIPTOR command output from the controller 11 when step S27 is executed. As stated above, since the controller 11 and the RSB 51 are not connected via the bus 2, the controller 11 directly writes information into the RSB 51 without issuing the WRITE DESCRIPTOR command. Conversely, when the controller 11 writes information into the RSB 61, the WRITE DESCRIPTOR command is issued.

In the opcode, which is the head of the WRITE DESCRIPTOR command, the value $0A_{16}$, which indicates the WRITE DESCRIPTOR, is set. In operand 0, the descriptor identifier for identifying the descriptor of the information to be written is set by the object position.

Thereafter, the value $50_{16}$, which represents the partial_replace, is set as the subfunction, thereby executing partial insert or partial delete. In performing insert, a new descriptor is inserted immediately before the descriptor defined by the operand specified by the descriptor_identifier. In performing delete, the descriptor defined by the descriptor_identifier is deleted.

The group_tag is used for updating the data which cannot be divided when being written into the descriptor. In this embodiment, the value $00_{16}$ (immediate), which indicates that the data is immediately written into the descriptor, is set. The replacement_data_length represents the number of bytes of the operand, i.e., the length of data to be written. The address indicates the position at which processing is executed. If the replacement_data_length indicates 0, partial delete is performed, in which case, the operand of the replacement_data does not exist. In this case, the original_data_length is greater than 0, and indicates the number of bytes to be deleted. If the original_data_length is 0, partial insert is executed, in which case, the replacement_data_length is greater than 0, and indicates the number of bytes to be inserted.

Referring back to FIG. 9, the process proceeds to step S28 in which the controller 11 closes the list, i.e., the RSB 51. Simultaneously, the controller 11 outputs the CLOSE command shown in FIG. 17 to the RSB 51. As stated above, the controller 11 directly closes the RSB 51 without issuing the CLOSE command since the controller 11 and the RSB 51 are not connected via the bus 2. If the controller 11 closes the RSB 61 of the DVCR 3, the CLOSE command is output.

The format of the CLOSE command illustrated in FIG. 17 is basically similar to the WRITE OPEN command shown in FIG. 10, except for the following point. The subfunction of the WRITE OPEN command indicates $03_{16}$, which represents WRITE OPEN, while the subfunction of the CLOSE command indicates $00_{16}$, which indicates CLOSE.

The process then proceeds to step S29 in which the controller 11 determines whether there are any other resources related to the reservation. In this case, although processing for making a reservation in the tuner sub-unit 12 has been completed, another processing for making a reservation in the VCR sub-unit 33 of the DVCR 3 is required. Accordingly, the process returns to step S12 in which processing similar to that performed on the RSB 51 is executed on the RSB 61 of the DVCR 3.

If it is determined in step S29 that there are no other resources related to the reservation, the processing is completed.

Figure 18:
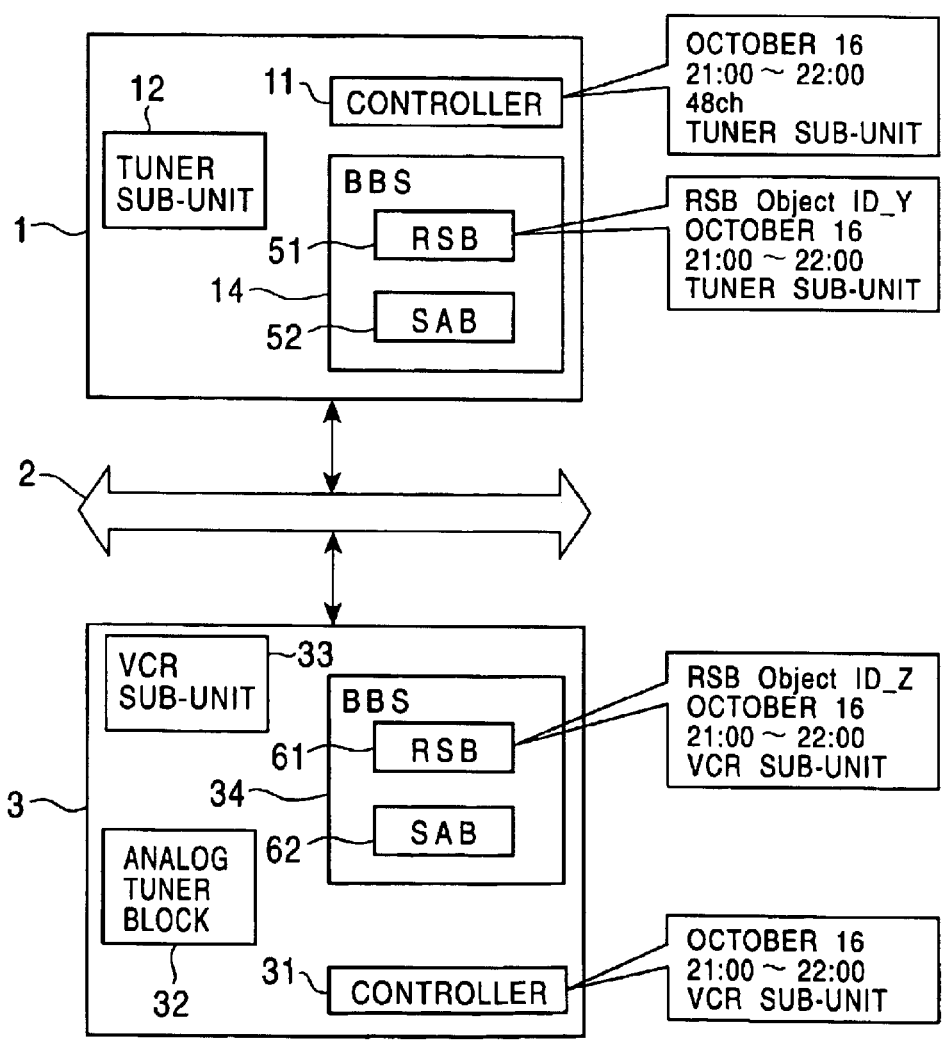
FIG. 18 illustrates another example of the operation of the network system shown in FIG. 2.

As discussed above, a series of record-reservation operations for causing the tuner sub-unit 12 to receive a video signal and to record it on the VCR sub-unit 33 has been made. It is now assumed that reservations are separately made, as shown in FIG. 18, i.e., a receiving reservation is made in the IRD 1 and a recording reservation is made in the DVCR 3. More specifically, a reservation is input into the controller 11 of the IRD 1 to cause the tuner sub-unit 12 to receive a predetermined channel (the 48 channel) during a predetermined period from 20:00 to 21:00 at October 16, and another reservation is input into the controller 31 to cause the VCR sub-unit 33 to start recording during a predetermined period from 20:00 to 21:00 at October 16. It appears to the user that the two reservations are the same reservation. However, it seems to the IRD 1 and the DVCR 3 that the two reservations have been separately made, and different IDs (BB Object ID_Y, and BB Object ID_Z) are respectively set in the IRD 1 and the DVCR 3 and are stored in the corresponding RSB 51 and the RSB 61.

Figure 7:
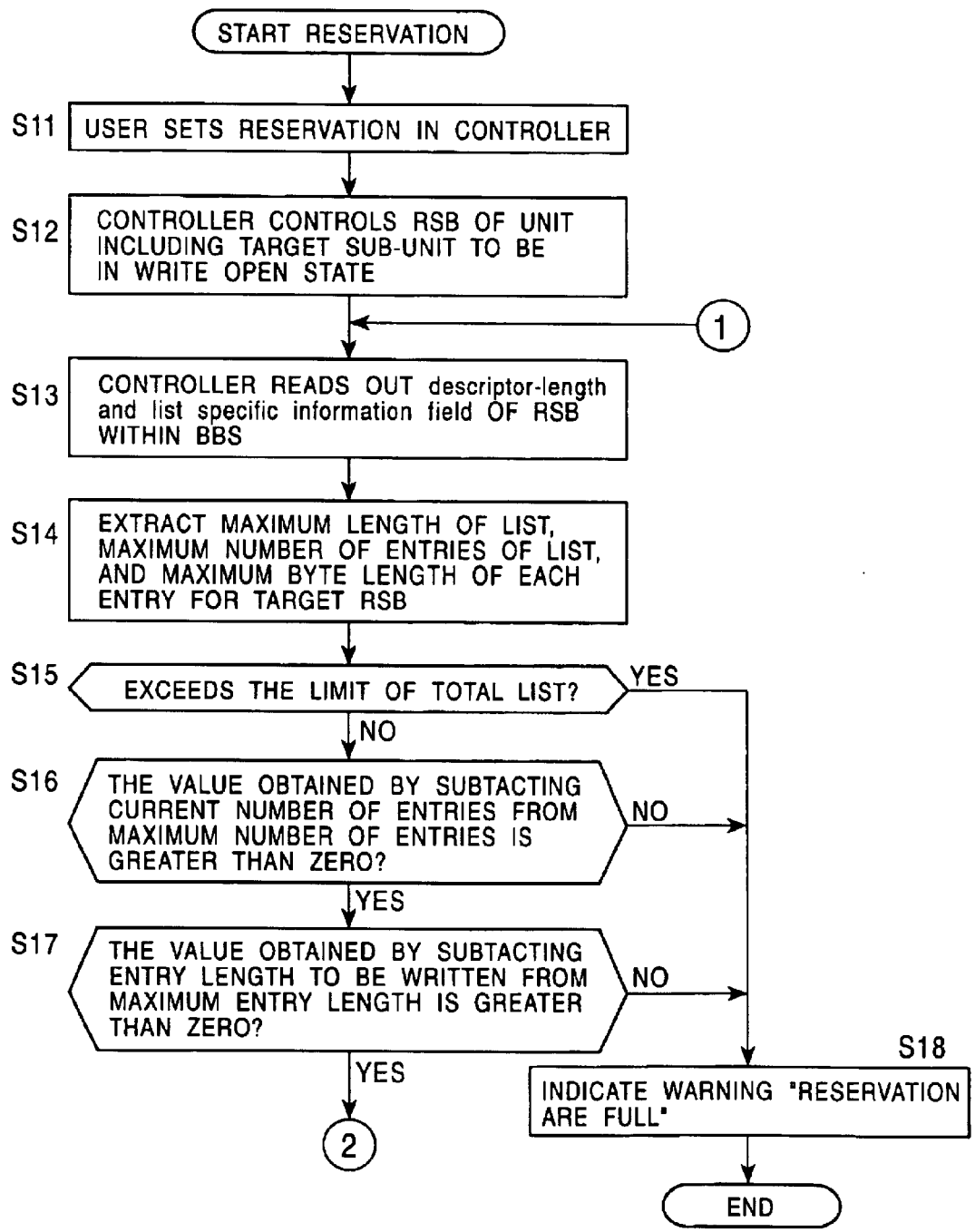
FIG. 7 is a flow chart illustrating the operation of the network system shown in FIG. 5.

Even when reservations are separately made in the individual units, reservation processing can be executed in a manner similar to that indicated by the flow charts of FIGS. 7 through 9. However, if reservations are separately made even when the sub-units of the different units are used in cooperation with each other, the occurrence of double-booking has to be checked by the user.

Figure 19:
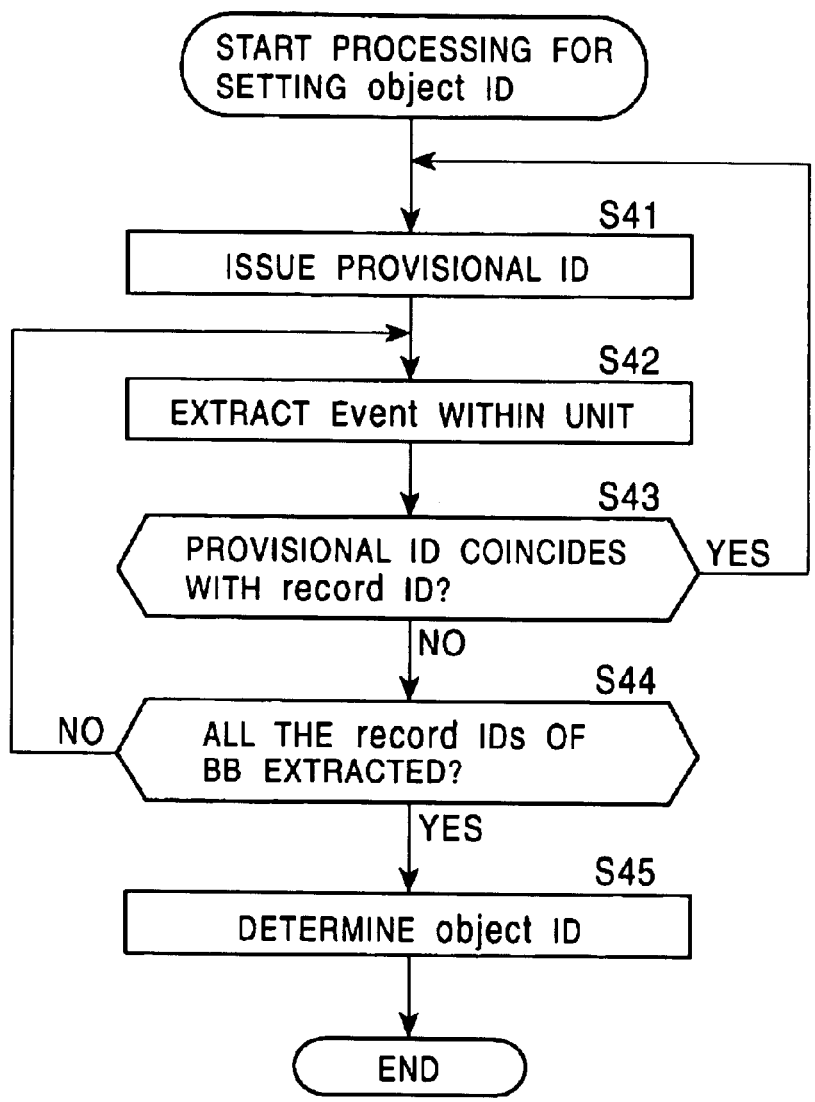
FIG. 19 is a flow chart illustrating the processing for setting the Object ID.

Processing for setting the Object ID is described below with reference to the flow chart of FIG. 19. After a recording reservation using the DVCR 3 is made on the IRD 1 by the user and is detected by the controller 11, the aforementioned reservation processing (contending-unit search processing) shown in FIGS. 7 through 9 is executed. When the recording reservation is accepted, the above processing for setting the Object ID commences. In this embodiment, the Object ID is employed for identifying the reservation (Event) to be started at a predetermined time for a predetermined period. The Object ID has 72 bits in which the most significant 64 bits are used for the ID unique to the unit possessing all the information concerning the reservation, i.e., for the GUID of the unit, and the least significant 8 bits are used for the unique value set in the unit, i.e., for the record ID. In this manner, the Object ID for identifying the Event is formed of the GUID and the record ID. Thus, the processing for setting the Object ID can be easily executed.

It is necessary to identify the Object ID among the individual units connected via the bus 2. The reason for this is as follows. The content of the RSB of one unit can be read by the other units, and processing may be simultaneously executed by the sub-units of the different units in cooperation with (relating to) each other. Accordingly, it is necessary for the individual units to check for any processing to be performed in cooperation with each other.

Among the units connected via the bus 2, the Object IDs may be sequentially set from number 1 every time an Event is generated. However, if a predetermined unit sets an Object ID for a predetermined Event, it has to check for contending IDs by reading all the Object IDs which have already been set in the other units. In this embodiment, however, the GUID is included in the Object ID, and the value of the GUID is reliably unique to each unit. It is thus essential only that each unit sets the record ID as a unique ID, which does not contend with the other record IDs, within the same unit. Accordingly, the Object ID obtained by combining the GUID with the record ID is reliably different from the Object IDs set by the other units. Thus, each unit sets the Object ID for the Event to be registered in the RSB according to the processing indicated by the flow chart of FIG. 19.

In step S41, the controller 11 issues a provisional ID for uniquely identifying the reservation information within the IRD 1 as a record ID of the Object ID (which consists of GUID and the record ID).

In step S42, the controller 11 extracts one of the Events registered in the RSB 51, and further extracts the record ID of the Object ID corresponding to the extracted Event. The controller 11 then determines in step S43 whether the provisional ID issued in step S41 coincides with the record ID extracted in step S42. If the outcome of step S43 is yes, the process returns to step S41 in which the provisional ID is changed. The processing of steps S41 through S43 is repeated until the provisional ID does not match the record ID.

If it is found in step S43 that the provisional ID does not coincide with the record ID, the controller 11 determines in step S44 whether all the Events concerning the related sub-unit which have been made public in the RSB 51 have been extracted. If the result of step S44 is no, the process returns to step S42, and the processing of steps S42 through S44 is repeated until it is determined in step S44 that all the Events have been extracted. If the outcome of step S44 is yes, the process proceeds to step S45. In step S45, the controller 11 adds the provisional ID (record ID). generated in step S41 to the unit ID (GUID) of the IRD 1, thereby generating the Object ID. The Object ID is then set in the RSB 51.

As discussed above, the Object ID can be set merely by checking the RSB corresponding to the related sub-unit (without needing to check the RSBs of the units including unrelated sub-units). The reason for this is as follows, as stated above. Since the Object IDs of the RSBs of the other units include the GUIDs unique to the individual units, it is not possible that the Object IDs set by the other units match the Object ID set by the corresponding unit. As a result, the Object ID can be easily set.

The BBS is discussed in greater detail below. FIG. 20 illustrates the format of the Subunit identifier Descriptor forming the BBS. The descriptor_length represents the length of the Descriptor. The generation_ID indicates which AV/C descriptor format of the BBS is used, and generally, $00_{16}$ is set.

The size_of_list_ID designates the number of bytes of the ID. The size_of_object_ID indicates the number of bytes of the Object ID. The size_of_object_position represents the number of bytes of the position of the object in the list. The number_of_root_object_lists indicates the number of root object lists to which the BBS is directly related.

The root_object_list_id_x (x=0, 1, 2, . . . n−1) represents the ID of each of the root object lists to which the BBS is related. The subunit_dependent_information_length designates the length of the subunit_dependent_information, and the information of the format and the contents on which the BBS is dependent is set in the subunit_dependent_information.

The subunit_dependent_information includes the non_info_block_fields_length, the bulletin_board_subunit_version, the number_of_supported_board_type(n), the supported_board_type_specific_of_length[0], the supported_board_type_specific_info[0] through supported_board_type_specific_info[n−1], and the supported_board_type_specific_of_length[0] through supported_board_type_specific_of_length[n−1], which represents the lengths of the supported_board_type_specific_info[0] through supported_board_type_specific_info[n−1].

The BBS further includes the manufacturer_dependent_length, which indicates the length of the manufacturer_dependent_information, and the manufacturer_dependent_information, which represents the information dependent on the manufacturer.

If the value of the root_object_list_id indicates the RSB, a predetermined value $1001_{16}$ is set, as shown in FIG. 21. In this manner, by fixing the ID representing the RSB (described as Resource Schedule List in FIG. 21) to the predetermined value, the processing for reading the RSB can be facilitated.

Figure 22:
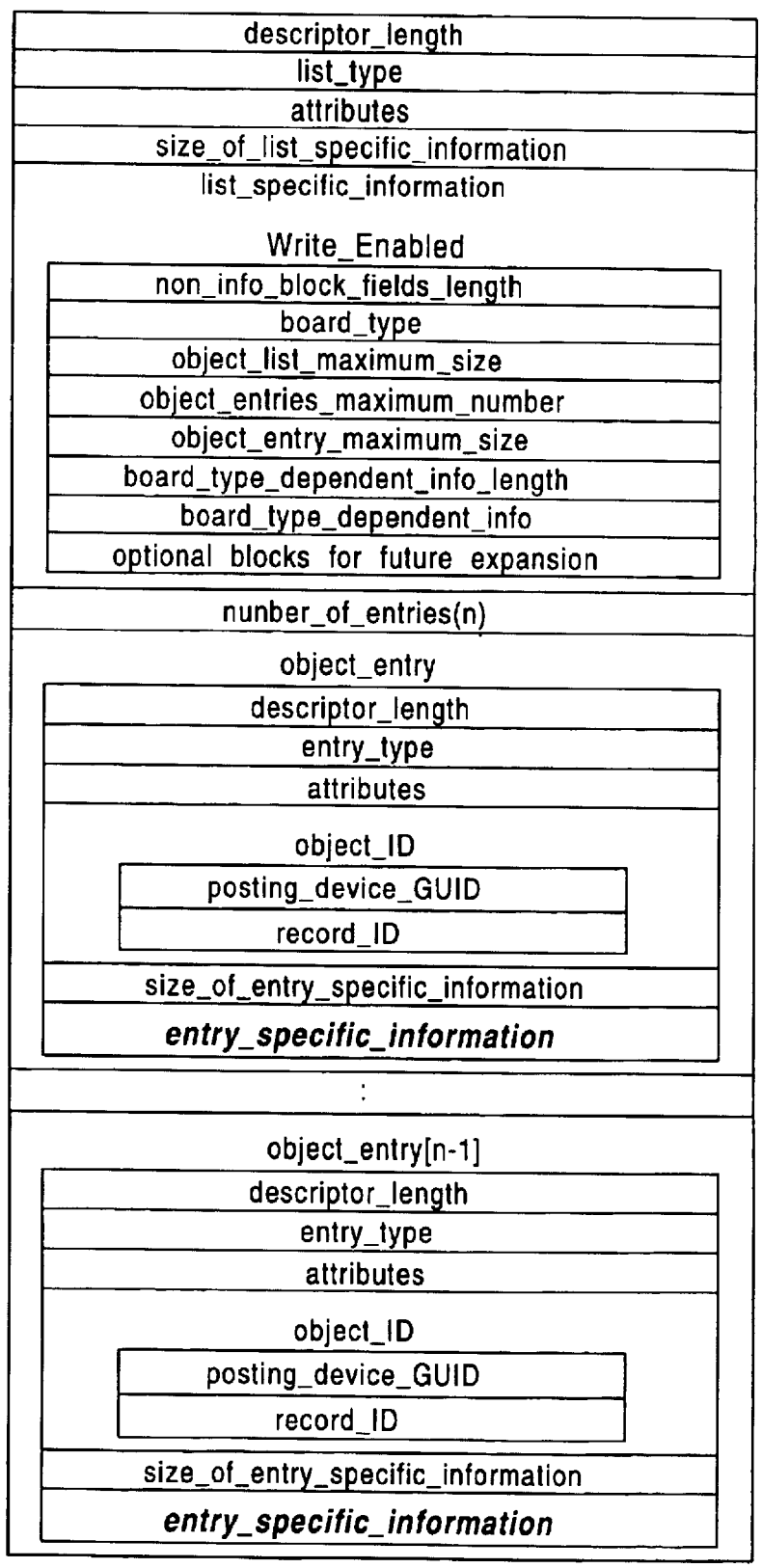
FIG. 22 illustrates the RSB format.

FIG. 22. illustrates the format of the RSB. The descriptor_length indicates the length of the RSB. The list_type indicates whether the RSB is Read Only or Write Enabled. The Read Only list represents that only reading is enabled, and the Write Enabled List indicates that writing, as well as reading, is enabled.

All The size_of_list_specific_information indicates the length of the list_specific_information, and the content of the list_specific_information varies according to the list_type. The information shown in FIG. 23 is set in the Write Enabled list_specific_information.

Figures 24, 25:
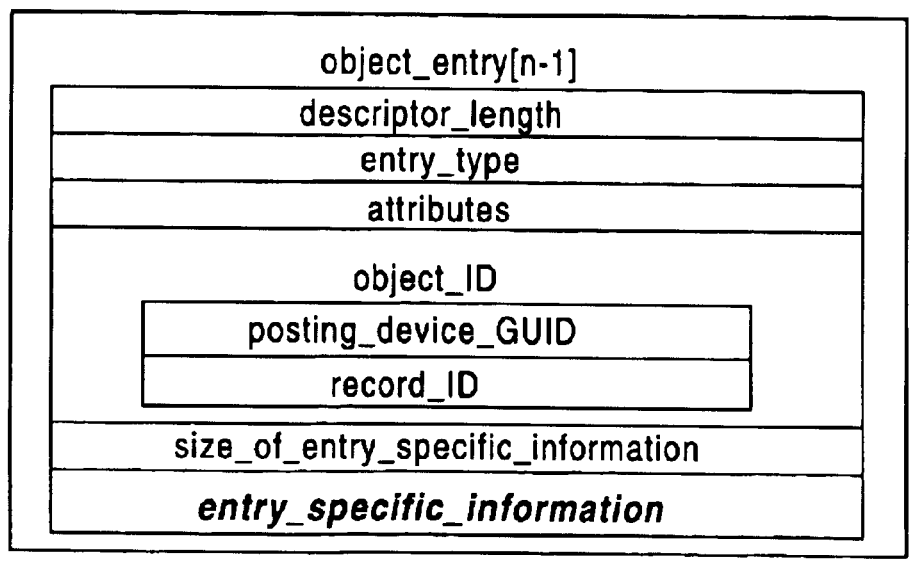
FIG. 24 illustrates the format of the board_type shown in FIG. 23.
FIG. 25 illustrates the format of the object_entry shown in FIG. 22.

The non_info_block_fields_length represents the number of bytes of the non info block fields. If the board_type is the Resource Schedule Board, as shown in FIG. 24, $01_{16}$ is set.

The object_list_maximum_size represents the maximum size of the object list. The object_entry_maximum_number indicates the maximum number of object entries in the list. The object_entry_maximum_size indicates the maximum size of each object entry. If there is no limit imposed on the object_list_maximum_size, the object_entry_maximum_number, and the object_entry_maximum_size, $0000_{16}$ is set in each field.

The above three fields are significant for the controller to recognize the capacity of the object list or the object entry.

The board_type_dependent_information_length designates the length of the board_type_dependent_information, and the information unique to the board type is set in the board_type_dependent_information.

The object_entry is configured specifically as illustrated in FIG. 25. The descriptor_length indicates the length of the descriptor. If the entry_type is Board entry Descriptor, the value $80_{15}$, which represents the Board, is set.

The object_ID is formed of the posting_device_GUID and the record_ID. The posting_device indicates the controller that has written (posted) information into the BBS, and accordingly, the posting_device_GUID represents the GUID of the controller. The record_ID designates an ID assigned to the Event within the unit. The size_of_entry_specific_information depicts the size of the entry_specific_information.

FIG. 26 illustrates the format of the entry_specific_information. The non_info_block_length indicates the number of bytes of the non-info block fields before the repeat_information. The start_time represents the second, the minute, the hour, the day, the month, and the year at which the event is started, as illustrated in FIG. 27. The year has 16 bits, the four numbers being each represented by a four-bit binary-coded decimal (BCD). The month has eight bits, the two numbers being each represented by a four-bit BCD. The day has eight bits, the two numbers being each indicated by a four-bit BCD. The hour has eight bits, the two numbers being each indicated by a four-bit BCD. The minute has eight bits, the two numbers being each indicated by a four-bit BCD. The second has eight bits, the two numbers being each represented by a four-bit BCD.

The start_time is easily identified by being indicated as the BCD. The time is represented by local time.

The Duration, which indicates the length of the event, is represented by the hour, the minute, and the second, as illustrated in FIG. 28. The hour has a total of 12 bits, the three numbers being each represented by a four-bit BCD. The minute has a total of eight bits, the two numbers being each indicated by a four-bit BCD. The second has a total of eight bits, the two numbers being each represented by a four-bit BCD.

By adding the Duration to the start_time, the end time of the event can be indicated. The length of the event is thus represented by the Duration without directly indicating the end time. This eliminates the need to modify the end time even when the start_time of the event is changed, thereby simplifying the updating processing.

The repeat_information_length indicates the length of the repeat_information. The repeat_information represents when and how the schedule is repeated. If the Scheduled Action is not repeated, the repeat_information_length indicates $00_{16}$.

The content of the repeat information varies according to the selected repeat type. The repeat type includes the Weekly schedule $00_{16}$ and the Interval schedule $10_{16}$, as shown in FIG. 29.

If the schedule is repeated every week, the Posting Device indicates the days of the week and the number of events to be repeated, as illustrated in FIG. 30.

The value $00_{16}$ shown in FIG. 29 is set in the repeat_type. The number of events is set in the number_of_events. The Weekly flags from Sunday to Saturday indicate the days of the week on which the event to be repeated is started. For example, if an event starting from 13:00 for three hours takes place every Monday and Wednesday, 1 is set in the Weekly flags of Monday and Wednesday, and 0 is set in the other Weekly flags.

The events to be repeated weekly can be recorded, as described above. Accordingly, only a smaller storage capacity is required compared to that required for storing, for example, the absolute time and date every Monday and Wednesday corresponding to the broadcast days.

When the Scheduled Action is repeated with predetermined intervals, the Posting Device describes the event by using the format shown in FIG. 31.

In this example, the value $10_{16}$ shown in FIG. 29 is set in the repeat_type. The number of events is set in the number_of_events.

The interval represents the interval from the start_time of a current event to the start_time of the subsequent event. This interval is represented by the hour, the minute, and the second. The hour has a total of 12 bits, the three numbers being each indicated by a four-bit BCD. The minute has a total of eight bits, the two numbers being each designated by a four-bit BCD. The second has a total of eight bits, the four numbers being each indicated by a four-bit BCD.

In this manner, the periodically repeated events can be stored. As a consequence, only a smaller capacity is needed compared to that required for storing the absolute time (time and date) at which each event is started.

The info blocks shown in FIG. 26 are represented by the format illustrated in FIG. 32. The compound_length indicates the byte length of the info block, except for the length field. The info_block_type is set to be $8900_{16}$. The primary_fields_length indicates the number_of_subunits and the number of bytes of the subunit_type_and_ID field.

The number_of_subunits represents the number of subunits used by the posting Device. The subunit_type_and_ID specifies the subunits to be used by the posting Device.

As discussed above, the start_time and the Duration are represented by the fixed lengths at the fixed address. In contrast, the ID information for identifying the subunit and the Posting Device using the subunit is stored as Info blocks at a predetermined address subsequent to the address of the start_time and the Duration. With this arrangement, the addition of Posting Devices can be easily handled.

Figure 20:
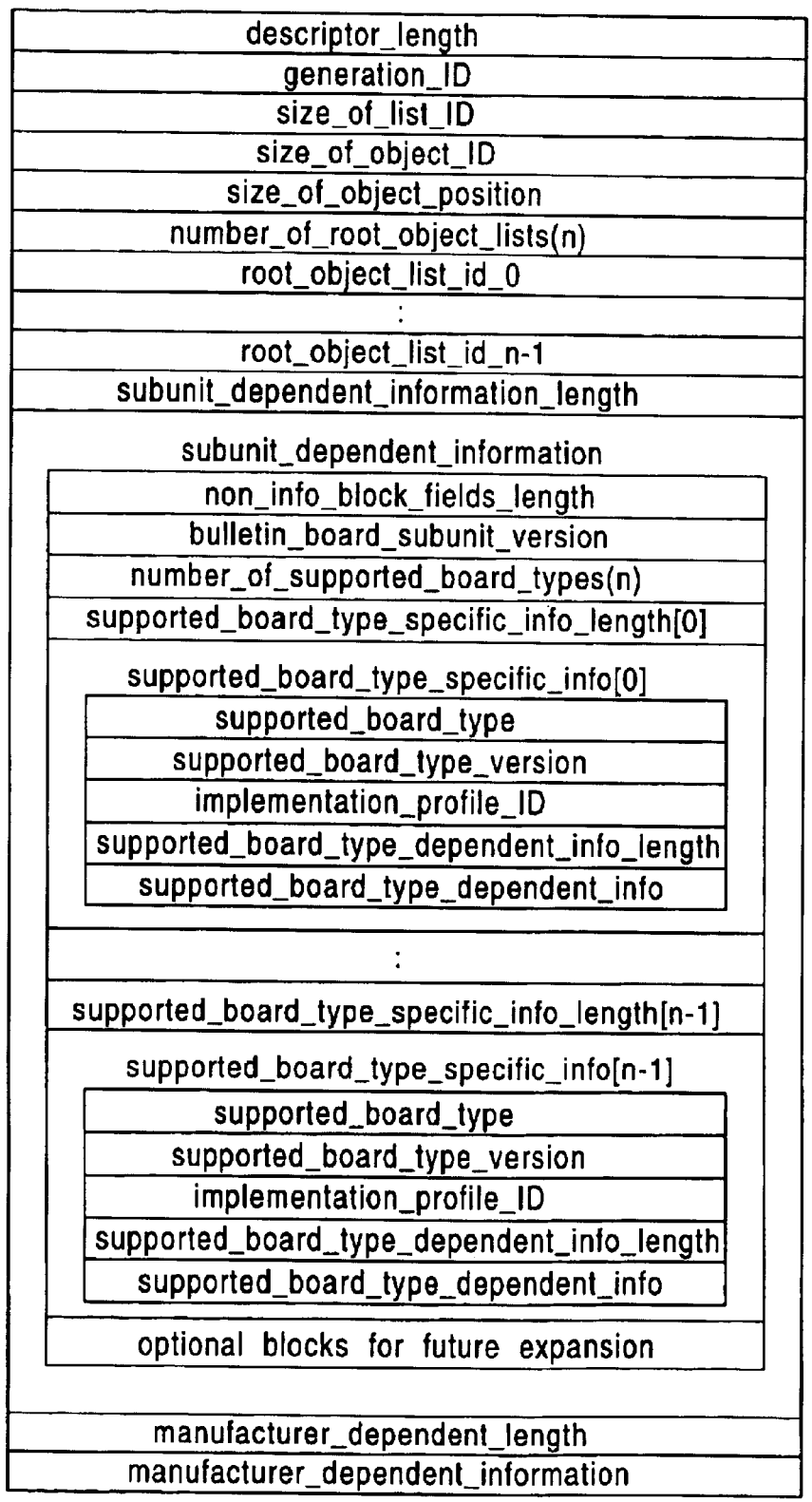
FIG. 20 illustrates the BBS format.

The supported_board_type_specific_information field shown in FIG. 20 is indicated by the format illustrated in FIG. 33. The value $01_{16}$, which indicates the RSB, shown in FIG. 24, is set in the supported_board_type. The supported_board_type_version represents the version number of the bulletin Board Type Specification. The implementation_profile_ID designates the profile ID version for this board type.

The supported_board_type_dependent_information_length indicates the number of bytes of the supported_board_type_dependent_information. The information inherent in each board type specification is described in the supported_board_type_dependent_information.

The above-described series of operations can be executed by hardware. Alternatively, software may be used, in which case, a software program implementing the above operations may be installed into a computer built into a controller specifically used as hardware. Alternatively, the above software program may be installed into a general-use personal computer that can execute the various functions by installing various programs.

Figure 34:
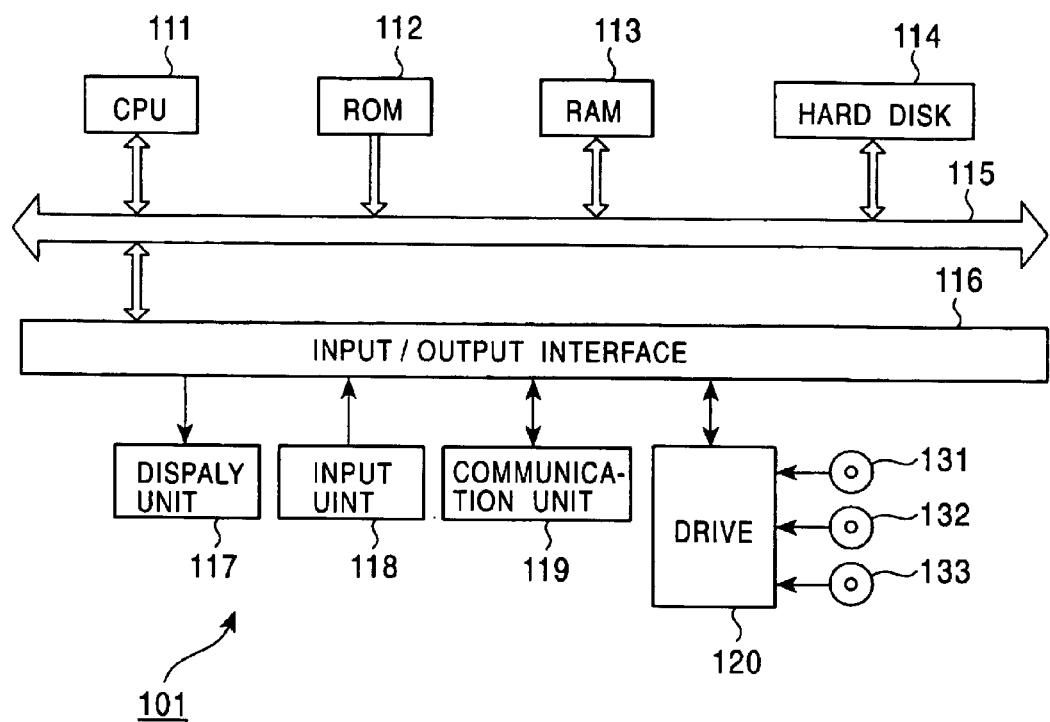
FIG. 34 is a block diagram illustrating an example of the configuration of a computer.

As shown in FIG. 34, a general-use personal computer 101 has, for example, a built-in central processing unit (CPU) 111. An input/output interface 116 is connected to the CPU 111 via a bus 115. In response to an instruction provided by a user from an input unit 118, such as a keyboard, a mouse, etc., via the input/output interface 116, the CPU 111 reads a program implementing the above-described operations from a recording medium, such as a read only memory (ROM) 112 or a hard disk 114, or a recording medium loaded into a drive 120, such as a magnetic disk 131, an optical disc 132, or a magneto-optical disk 133. The CPU 111 then installs the read program into a random access memory (RAM) 113 and executes it. The program installed in the hard disk 114 may be a program stored in a recording medium and distributed to the user, or may be a program transferred through a satellite or a network and received. by a communication unit 119, and then installed in the hard disk 14.

After processing the program, the CPU 111 outputs an image signal to a display unit 117, such as a liquid crystal display (LCD) or a cathode ray tube (CRT), via the input/output interface 116.

As is seen from the foregoing description, according to the information processing apparatus, the information processing method, and the recording medium of the present invention, reservation information of a sub-unit is stored, and also, in response to a request from another information processing apparatus, the stored reservation information is read out and supplied to the apparatus. As a consequence, double-booking can be prevented.

What is claimed is:

1. An information processing apparatus having unique identification information connected to a network with one or more of other information processing apparatuses each connected to said network and each having unique identification information, said information processing apparatus comprising:

function execution means for executing a predetermined function;

communication means for communicating with said other information processing apparatus connected to said network by sending and/or receiving packets on said network;

input means for inputting reservation information concerning a reservation of said predetermined function;

storage means for storing the reservation information concerning the reservation of said predetermined function;

supply means for reading out the reservation information stored in said storage means and supplying the reservation information to said other information processing apparatus connected to said network via said communication means in response to a request from said other information processing apparatus connected to said network; and writing means for writing the reservation information of said information processing apparatus into said storage means and for writing reservation information of a sub-unit of said other information processing apparatus into storage means of said other information processing apparatus when a reservation is made for using said information processing apparatus in cooperation with said other information processing apparatus at the same time.

2. An information processing apparatus according to claim 1, further comprising comparison means for comparing the reservation information input by said input means with the reservation information stored in said storage means of said information processing apparatus and the reservation information of said storage means of said other information processing apparatus;

wherein said writing means writes the reservation information in accordance with a comparison result obtained by said comparison means.

3. An information processing apparatus according to claim 1, wherein said writing means restricts the reservation information to be written into said storage means of said information processing apparatus from said other information storage apparatus when said writing means writes the reservation information into said storage means of said information processing apparatus.

4. An information processing apparatus according to claim 3, wherein said writing means interrupts said other information processing apparatus from reading the reservation information from said storage means of said information processing apparatus when said writing means writes the reservation information into said storage means of said information processing apparatus.

5. An information processing apparatus having unique identification information connected to a network with one or more of other information processing apparatuses each connected to said network and each having unique identification information, said information processing apparatus comprising:

function execution means for executing a predetermined function;

communication means for communicating with said other information processing apparatus connected to said network by sending and/or receiving packets on said network;

input means for inputting reservation information concerning a reservation of said predetermined function;

storage means for storing the reservation information concerning the reservation of said predetermined function; and supply means for reading out the reservation information stored in said storage means and supplying the reservation information to said other information processing apparatus connected to said network via said communication means in response to a request from said other information processing apparatus connected to said network, wherein said storage means stores limitation information concerning a limitation of the reservation information to be stored, and said supply means supplies the limitation information to said other information processing apparatus in response to a request from said other information processing apparatus.

6. An information processing apparatus having unique identification information connected to a network with one or more of other information processing apparatuses each connected to said network and each having unique identification information, said information processing apparatus comprising:

function execution means for executing a predetermined function;

communication means for communicating with said other information processing apparatus connected to said network by sending and/or receiving packets on said network;

input means for inputting reservation information concerning a reservation of said predetermined function;

storage means for storing the reservation information concerning the reservation of said predetermined function; and supply means for reading out the reservation information stored in said storage means and supplying the reservation information to said other information processing apparatus connected to said network via said communication means in response to a request from said other information processing apparatus connected to said network, wherein the reservation information includes a start time and a period for using, and wherein the reservation information includes apparatus information concerning the information processing apparatus, and the apparatus information is stored at an address position subsequent to the address positions of the start time and the period for using.

* * * * *